US006201712B1

(12) United States Patent
Barnett

(10) Patent No.: US 6,201,712 B1
(45) Date of Patent: Mar. 13, 2001

(54) REPLACEABLE ANTENNA FOR A RADIO DEVICE

(75) Inventor: Ricky William Barnett, Radlett (GB)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/107,778

(22) Filed: Jun. 30, 1998

(30) Foreign Application Priority Data

Jul. 7, 1997 (GB) .................................................. 9714239

(51) Int. Cl.[7] ................................ H04B 1/03; H04B 1/08
(52) U.S. Cl. ........................... 361/814; 220/4.02; 455/90; 379/440
(58) Field of Search ..................................... 361/752, 814; 220/4.02; 455/90; 379/440, 433; D13/103

(56) References Cited

U.S. PATENT DOCUMENTS

| | | |
|---|---|---|
| 2,916,670 | 12/1959 | Pederson . |
| 2,960,627 | 11/1960 | Hunt . |
| 3,461,346 | 8/1969 | Lilly . |
| 3,569,780 | 3/1971 | Skinner . |
| 3,631,359 | 12/1971 | Jones . |
| 3,822,394 | 7/1974 | Toho . |
| 3,854,073 | 12/1974 | Quenelle . |
| 3,986,144 | 10/1976 | Russo . |
| 4,158,922 | 6/1979 | Dana, III . |
| 4,367,515 | 1/1983 | Beard . |
| 5,013,972 | 5/1991 | Malkieli et al. . |
| 5,033,212 | 7/1991 | Evanyk . |
| 5,138,329 | 8/1992 | Saarnimo et al. .................. 343/702 |
| 5,357,697 | 10/1994 | Lin . |
| 5,381,615 | 1/1995 | Macmillan . |
| 5,396,720 | 3/1995 | Hwang et al. . |
| 5,422,628 | 6/1995 | Rodgers . |
| 5,438,488 | 8/1995 | Dion . |
| 5,457,900 | 10/1995 | Roy . |
| 5,500,635 | 3/1996 | Mott . |
| 5,599,088 | 2/1997 | Chien . |

FOREIGN PATENT DOCUMENTS

| | | |
|---|---|---|
| 2675025 | 10/1992 | (FR) . |
| 1051000 | 12/1966 | (GB) . |
| 2 307 107 | 5/1997 | (GB) . |
| 2 308 013 | 6/1997 | (GB) . |

OTHER PUBLICATIONS

V. Veley, The Benchtop Electronics Reference Manual, Tab Books Inc., Blue Ridge Summit, PA, pp. 429–430, 1987.
J. Millman et al, Pulse, Digital and Switching Waveforms, McGraw–Hill Book Co., New York, New York, pp. 438–411, 1965.

*Primary Examiner*—Jayprakash N. Gandhi
(74) *Attorney, Agent, or Firm*—Perman & Green, LLP

(57) ABSTRACT

A radio device comprising a housing 50 having an opening 52 and an internal retaining recess 58; a resilient antenna support sleeve 60 inserted in the opening, the sleeve including a lug 70 projecting into the retaining recess 58 to oppose withdrawal of the antenna support sleeve; and an antenna 10 mounted in the antenna support sleeve. The walls of the retaining recess 58 and the surfaces of the lug 70 are shaped such that on rotation of the sleeve 60 the lug 70 is urged inwardly and escapes from the retaining recess 58.

7 Claims, 2 Drawing Sheets

REPLACEABLE ANTENNA FOR A RADIO DEVICE

BACKGROUND OF THE INVENTION

The present invention relates generally to radio devices. In such devices, it is known to equip a housing of the device with an external antenna which projects through an opening in the housing.

Damage to the antenna through snapping, bending or fracture can occur. It is, therefore, a requirement for the radio device that the damaged antenna be readily replaceable.

SUMMARY OF THE INVENTION

With this in mind, in one aspect, the present invention provides a radio device comprising: a housing having an opening and an internal retaining recess; a resilient antenna support sleeve inserted in the opening, the sleeve including a lug projecting into the retaining recess to oppose withdrawal of the antenna support sleeve; an antenna mounted in the antenna support sleeve; the walls of the retaining recess and the surfaces of the lug being shaped such that on rotation of the sleeve the lug is urged inwardly and escapes from the retaining recess.

By virtue of these features, on rotation of the sleeve the lug is urged inwardly and escapes from the retaining recess, thereby facilitating withdrawal of the antenna support sleeve from the housing.

Preferably, the lug comprises a chamfered surface. The chamfered surface on rotation of the sleeve bears against a side wall defining the retaining recess and assists in the progressive inward deformation of the sleeve which helps the lug to escape from the retaining recess. Preferably, the lug comprises a pair of chamfered surfaces such that the same effect can be achieved in either direction. Also, the lug may include a chamfered surface which facilitates the insertion of the lug into the opening.

Preferably, the lug includes a face. The face opposes a top wall defining the recess, whereupon if an attempt is made to withdraw the sleeve from the opening, the face bears against the top wall to oppose this withdrawal.

In a further aspect, the present invention provides an antenna support sleeve suitable for removable insertion into an opening of the housing of a radio device, comprising a tubular wall from which upstands a lug, the wall being sufficiently deformable such that when an inward force is applied to the lug during said insertion the wall deforms but the lug does not.

BRIEF DESCRIPTION OF THE DRAWINGS

Exemplary embodiments of the invention are hereinafter described with reference to the accompanying drawings, in which.

DETAILED DESCRIPTION OF PREFERRED EMBODIMENTS

Figure 1:
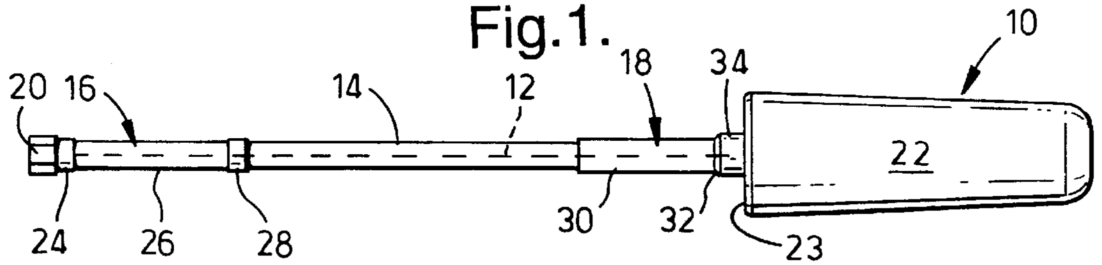
FIG. 1 shows a view of an antenna.

Referring to FIG. 1, an antenna for signal transmission and reception in a radio telephone is generally designated 10. It comprises an elongate radiating element 12 (shown in dashed lines) surrounded by an insulating sleeve or covering 14. The antenna 10 further comprises first and second electrically-conductive contact elements 16, 18 conductively coupled to respective first and second ends of the elongate radiating element 12. The second contact element 18 is conductively coupled to a helical radiating element which is housed in an insulating cap 22 of cylindrical shape. The bottom surface of the insulating cap is designated 23.

The first contact element 16 is a sleeve of circular but non-uniform cross-section along its length, which is closed off at one end by an hexagonal stop member 20 and receives in the other open end the first end of the elongate radiating element 12.

The first contact element 16 comprises two generally cylindrical end portions 24,28 joined by a cylindrical intermediate portion 26. The end portions 24,28 are of a slightly larger outer diameter than the intermediate portion 26. The end portion 24 abuts the stop member 20. The end region of end portion 28 which opens to receive the elongate radiating element 12 is slightly tapered relative to the rest of the end portion 28. The contact element 18 is also generally in the form of a sleeve. The sleeve comprises a cylindrical main portion 30 and a cylindrical end portion 34 which are joined by an intermediate portion 32. The main portion 30 is open to receive the elongate radiating element 12. This open end of the main portion 30 is slightly tapered relative to the rest of the main portion 30. An end region of the end portion 34 abuts the bottom surface of the insulating cap 23. The intermediate portion 32 flares from its end region connected to the main portion 30 or tapers from its end region connected to the end portion 34. As a result, the outer diameter of the main portion 30 is less than that of the end portion 34. The outer diameter of the main portion 30 of the second contact element 18 is the same as that of the end portions 24,28 of the first contact element.

The outer profile of the rod antenna 10 determines the mechanical functionality of the antenna, in use, as described later.

Figure 2:
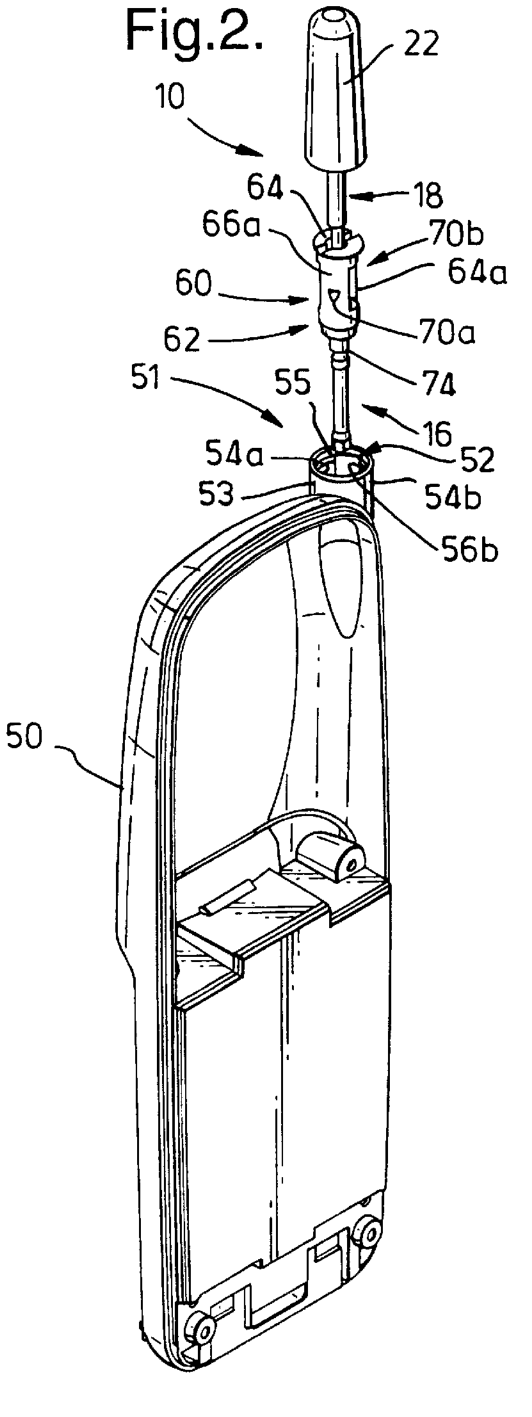
FIG. 2 shows the antenna of FIG. 1 inserted into an antenna support sleeve prior to the insertion of the antenna support sleeve into a housing.

FIG. 2 shows the antenna 10 inserted in an antenna support sleeve 60 just before the antenna 10 and the antenna support sleeve 60 are fitted to the rear casing 50 or so-called 'B'-cover of a radiotelephone.

Figure 4A:
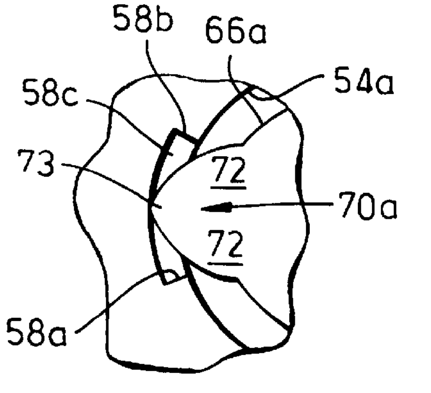
FIGS. 4(*a*) and 4(*b*) show close-up views of the engagement of the locating lug and retaining recess visible in FIG. 3.
Figure 4B:
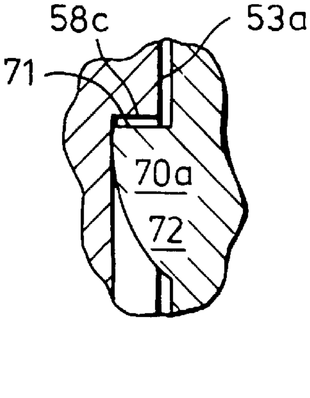

The support sleeve 60 comprises a cylindrical wall 62 which at a first end thereof includes a pair of planar opposed semi-circular lips 64. The lips 64 occupy a plane perpendicular to the longitudinal axis of the cylindrical wall 62 and define an aperture of substantially smaller diameter than the inner diameter of the cylindrical wall at the first end thereof. The diameter of the aperture formed by the lips 64 is approximately the same as the outer diameter of the end portion 34 of the second contact element 18. The cylindrical wall 62 has a pair of opposing slots 64*a,* 64*b* which extend longitudinally along most of the length of the wall 62. The slots 64*a,* 64*b* do not, however, reach either end of the wall 62. The wall regions separating the slots are designated 66*a,* 66*b*. A pair of locating lugs 70*a,* 70*b* project from the wall regions 66*a,* 66*b* respectively from generally midway therealong. From the FIG. 2 view, only the wall region 66*a,* the slot 64*a* and the locating lug 70*a* are visible. FIGS. 4(*a*) and 4(*b*) show the locating lug 70*a* in more detail. Locating lug 70*b* is not shown but is identical. Locating lug 70*a* includes a top face 71 which is relatively flat as can be seen in the FIG. 4(*b*) vertical cross-sectional view. The locating lug 70*a* also includes chamfered side surfaces 72 and a chamfered leading surface 73 as can be seen in the FIG. 4(*a*) view from below. At the second end of the support sleeve 60, a friction clip 74 is fitted. The friction clip 74 is a split collar made from a sheet of metal having a stud formed at one end and a guide groove formed in the other end. The sheet is coiled into a closed collar in which the stud rides in the guide groove. The minimum and maximum radii of the collar are controlled by the longitudinal extent of the guide groove. The collar is formed such that at the minimum radius determined by the guide groove the collar urges itself to a still smaller radius. The elongate radiating element 12 passes through the aperture formed by the lips 64 and through the friction clip 74.

As can be seen in FIG. 2, the rear casing 50 includes a chimney 51, with an opening 52, which projects from the top of the casing and into which the support sleeve 60 can be inserted. The chimney 51 is defined by a wall 53 of circular cross-section having an inner surface 54*a* and an outer surface 54*b*. The chimney 51 is open at its bottom end region to the inside of the casing. Most of the chimney wall 53 is an exterior wall of the casing 50. A portion of the chimney wall 53 is, however, interior to the casing 50 and is designated 53*a*. Immediately below the opening 52, the internal diameter of the chimney wall 53 abruptly narrows to form a circumferential ledge 55. Extending along the length of the inner surface 54*a* of the chimney wall, a pair of shallow tracks 56*a*, 56*b* are formed. In the FIG. 2 view, only track 56*b* is visible. The track 56*a* leads to a retaining recess 58 (visible in FIG. 3) which is formed at the end of the wall portion 53*a*. The retaining recess 58 takes the form of a through-hole in the wall portion 53*a* and is defined by first and second side walls 58*a*, 58*b* and a top wall 58*c*.

From the position illustrated in FIG. 2, the antenna support sleeve 60 is inserted into the opening 52 of the chimney 51 such that the locating lugs 70*a*, 70*b* can enter and slide within the tracks 56*a*, 56*b*. The chamfered leading surface 73 or nose of the locating lugs 70*a*, 70*b* facilitate sliding. The antenna support sleeve 60 reaches its fully inserted position when the lips 64 of the support sleeve abut the ledge 55 of the chimney 51. As the support sleeve is being inserted in this way, the inner surface 54*a* of the chimney wall 53 in the region of the tracks 56*a*, 56*b* imposes (because of the close clearance fit between the support sleeve 60 and the chimney 51) a compressive force on the support sleeve 60 via its locating lugs 70*a*, 70*b*. The compressive force causes deformation of the wall 62, which deformation is accommodated by the slots 64*a*, 64*b*, but no deformation of the lugs 70*a*, 70*b* takes place. As the fully inserted position is reached, the compressive force is relieved by the locating lug 70*a* popping or springing into the retaining recess 58. This is shown in FIG. 4(*a*) from a view immediately below the locating lug 70*a* and in FIG. 4(*b*) from an axial cross-sectional view of the support sleeve 60. In the fully inserted position, the locating lug 70*b* remains in the track 56*b*. In the fully inserted position, the top wall 58*c* of the retaining recess bears against the top face 71 of the lug 71*a* to oppose withdrawal of the support sleeve 60.

Figure 3:
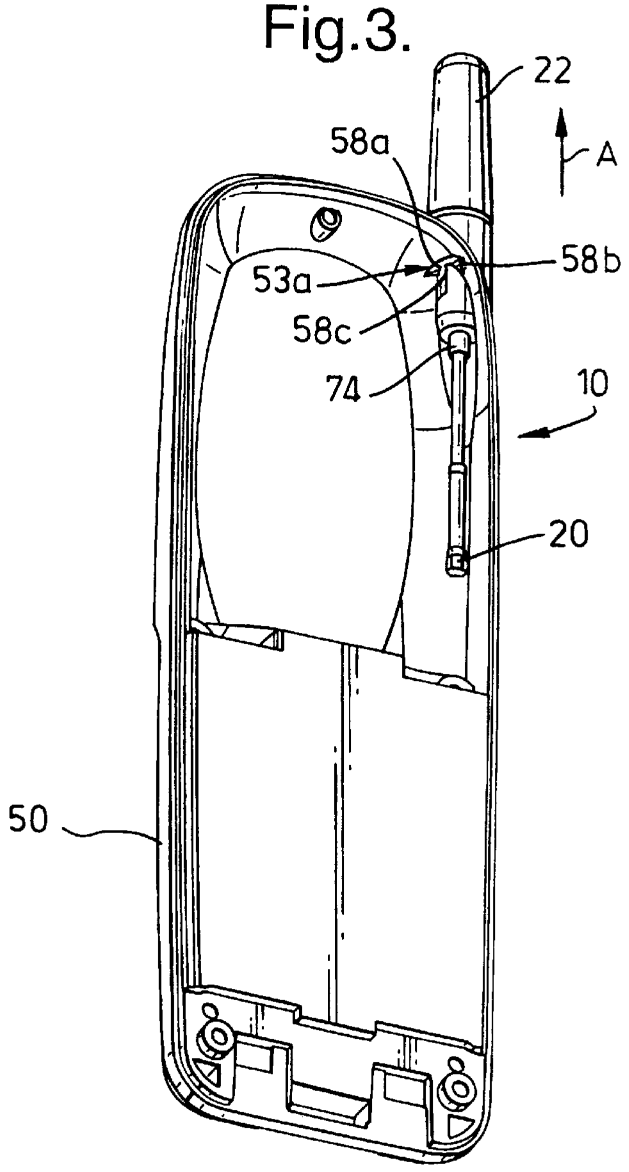
FIG. 3 shows the antenna support sleeve inserted in the housing and the rod antenna in its fully retracted condition.

FIG. 3 shows the antenna 10 in its retracted operational condition. In this condition, the friction clip 74 grips around the end portion 34 of the second contact element 18. Also, the helical radiating element in the cap 22 is coupled via the friction clip 74 to the transmit/receive circuitry of the radiotelephone. In order to extend the antenna 10, the cap 22 is pulled in the direction of arrow A in FIG. 3. Because of the relatively large outer diameter of the end portion 34, it is tightly gripped by the friction clip 74. This gripping action provides the user with a feeling that the antenna 10 is positively locked in its retracted condition and also assists in maintaining a reliable electrical connection between the friction clip 74 and the second contact element. Once the initial resistive force applied by the friction clip 74 is overcome, the antenna 10 starts to extend and continues to do so until it reaches its extended condition at which point the stop member 20 abuts the friction clip 74. At this point the end portion 24 of the first contact element 16 is gripped within the friction clip 74 and the relatively large outer diameter of the end portion 24 provides the user with the feeling that the antenna 10 is positively locked in this extended operational condition and serves to ensure that there is a reliable electrical connection between the friction clip 74 and the first contact element 16. Between these two extreme operational positions, the friction clip 74 provides varying degrees of frictional resistance depending on the diameter of the antenna part within the friction clip 74 in order to provide the desired mechanical functionality, For example, when the covering 14 is passing through the friction clip 74 the frictional resistance afforded by the friction clip 74 can be negligible because the diameter of the covering 14 is less than the minimum possible radius of the collar of the friction clip 74.

In order to withdraw the support sleeve 60, for example so as to be able to replace a damaged antenna 10, it is rotated in either direction such that a chamfered side surface 72 of the bears against the neighbouring side wall 58*a*, 58*b* of the retaining recess (see FIG. 4). The chamfered surface facilitates inward deformation of the support sleeve 60, whereby the lug 70*a* is able to spring free of the retaining recess so that the support sleeve 60 and the antenna 10 can together be removed from the chimney 51.

During the operations of withdrawing and inserting the antenna support sleeve, no deformation of the lugs 70*a*, 70*b* takes place. This means that the antenna support sleeve can be properly inserted/withdrawn many times. It will, of course, be appreciated that during these operations the lugs 70*a*, 70*b* do suffer some wear due to frictional contact with the inner surface 54*a* of the well wall.

In other embodiments, the side walls 58*a*, 58*b* of the retaining recess can be shaped to facilitate the lug 70*a* escaping from the retaining recess on rotation of the support sleeve 60. This can be additional to or instead of the shaping of the side walls 72 of the lug 70*a*. In other embodiments, the lug 70*b* can be dispensed such that there is only a single lug 70*a*.

In other embodiments (not shown), the retaining recess 58 can be dispensed with, the clearance fit with the well wall 53 being sufficient to enable the antenna support sleeve to be held in place, yet the flexibility/deformability of the sleeve wall 62 in combination with the frictional interplay between the lugs 70*a*, 70*b* and the well wall 53 allowing for insertion/withdrawal of the antenna support sleeve.

What is claimed is:

1. A radio device comprising:

a housing having an opening and an internal retaining recess having walls;

a resilient antenna support sleeve positioned in the opening, the sleeve including a lug projecting into the retaining recess of said housing to oppose withdrawal of the antenna support sleeve, the lug having a plurality of surfaces;

an antenna mounted in the antenna support sleeve;

the walls of the retaining recess and the surfaces of the lug being shaped such that on rotation of the sleeve the lug is urged inwardly and is removable from the retaining recess.

2. A radio device as in claim 1, wherein the lug comprises a chamfered surface which facilitates the lug escaping from the retaining recess on rotation of the sleeve.

3. A radio device as in claim 1, wherein the lug includes a chamfered surface which facilitates the insertion of the lug into the opening.

4. A radio device as in claim 1, wherein the lug includes a face which serves to oppose withdrawal of the support sleeve from the opening when the lug is in the retaining recess.

5. A radio device as in claim 1, wherein the antenna includes a rod antenna which is mounted for sliding movement in the antenna support sleeve between an extended condition and a retracted condition.

6. A radio device as in claim 5, comprising a friction clip for governing the sliding of the antenna and providing electrical connection to radio circuitry.

7. A resilient antenna support sleeve for insertion into an opening of a radio device, the sleeve including a lug for projecting into a retaining recess within the radio device to oppose withdrawal of the antenna support sleeve, further comprising:

an antenna mounted in said antenna support sleeve, and said lug having a plurality of surfaces, said surfaces of said lug being shaped such that, in use, on rotation of said sleeve the lug is urged inwardly to escape from said retaining recess.

* * * * *